(12) United States Patent
Ruffato et al.

(10) Patent No.: US 12,199,675 B2
(45) Date of Patent: Jan. 14, 2025

(54) DEVICE FOR MULTIPOLE PHASE DIVISION DEMULTIPLEXING/MULTIPLEXING AND SPATIAL DIVISION TELECOMMUNICATIONS SYSTEM THEREOF

(71) Applicants: Università di Padova, Padua (IT); CONSIGLIO NAZIONALE DELLE RICERCHE, Rome (IT)

(72) Inventors: Gianluca Ruffato, Padua (IT); Filippo Romanato, Padua (IT); Vincenzo Grillo, Gattatico (IT); Enzo Rotunno, Parma (IT)

(73) Assignees: UNIVERSITÀ DI PADOVA, Padua (IT); CONSIGLIO NAZIONALE DELLE RICERCHE, Rome (IT)

( * ) Notice: Subject to any disclaimer, the term of this patent is extended or adjusted under 35 U.S.C. 154(b) by 159 days.

(21) Appl. No.: 18/040,447

(22) PCT Filed: Aug. 3, 2021

(86) PCT No.: PCT/IB2021/057086
§ 371 (c)(1),
(2) Date: Feb. 3, 2023

(87) PCT Pub. No.: WO2022/029616
PCT Pub. Date: Feb. 10, 2022

(65) Prior Publication Data
US 2023/0291474 A1    Sep. 14, 2023

(30) Foreign Application Priority Data

Aug. 5, 2020    (IT) .................... 102020000019327

(51) Int. Cl.
H04B 10/2581    (2013.01)
H04J 14/04    (2006.01)

(52) U.S. Cl.
CPC ......... *H04B 10/2581* (2013.01); *H04J 14/04* (2013.01)

(58) Field of Classification Search
CPC ..................... H04B 10/2581; H04J 14/04
(Continued)

(56) References Cited

U.S. PATENT DOCUMENTS

| 2013/0027249 A1* | 1/2013 | Schantz | ............... H01Q 3/26 |
| | | | 342/368 |
| 2020/0201136 A1* | 6/2020 | Johnson | .............. G02F 1/33 |
| 2022/0077594 A1* | 3/2022 | Gamalski | ............ H01Q 21/24 |

FOREIGN PATENT DOCUMENTS

| CN | 110161681 B | * | 5/2020 |
| WO | 2016/049502 A1 | | 3/2016 |

(Continued)

OTHER PUBLICATIONS

Willer et al; recent advances in high-capacity free-space optical and radio-frequency communications using orbital angular momentum multiplexing ; Oct. 2016; Royal society publishing; pp. 1-18. (Year: 2016).*

(Continued)

*Primary Examiner* — Amritbir K Sandhu
(74) *Attorney, Agent, or Firm* — Workman Nydegger (57) ABSTRACT

It is disclosed a device for multipole phase division multiplexing and demultiplexing and a spatial division telecommunications system comprising the multiplexing and demultiplexing devices. The multipole phase demultiplexing device comprises a cascade of a beam transformer and a phase corrector, wherein the beam transformer performs a circular-sector transformation of a plurality of multipole (Continued)

phase electromagnetic beams. The multipole phase multiplexing device comprises a cascade of a beam transformer and a phase corrector, wherein the beam transformer performs a combination of |m| circular-sector transformations of a plurality of tilted electromagnetic beams.

20 Claims, 2 Drawing Sheets

(58) Field of Classification Search
USPC .......................................................... 398/79
See application file for complete search history.

(56) References Cited

FOREIGN PATENT DOCUMENTS

| WO | WO-2018037362 A1 | * | 3/2018 | ........... G02B 6/2848 |
| WO | WO-2019207438 A1 | * | 10/2019 | ......... G02B 27/1086 |
| WO | WO-2020208570 A1 | * | 10/2020 | ............. G02F 2/008 |

OTHER PUBLICATIONS

Ruffato et al; Multipole-phase division multiplexing ; Nov. 2021; Optics Express; pp. 1-14. (Year: 2021).*
International Search Report and Written Opinion, mailed Oct. 6, 2021, from PCT/IB2021/057086.
Ruffato et al, "Total angular momentum sorting in the telecom infrared with silicon Pancharatnam-Berry transformation optics", arxiv.org, Cornell University Library, 201 Olin Library Cornell University Ithaca, NY 14853,Feb. 4, 2019.
Ruffato G et al., "Demultiplexing of Orbital Angular Momentum Beams by Diffractive Optics", 2018 European Conference on Optical Communication (ECOC), IEEE,Sep. 23, 2018, p. 1-3.
Takashima, S. et al., "Integer Multiplier for Orbital Angular Momentum of Light using Circular-Sector Transformation", Phys. Rev. A 100(6), 063822, Feb. 27, 2019.
Ruffato, G. et al., "Multiplication and division of the orbital angular momentum of light with diffractive transformation optics", Light: Sci. & Appl. 8 (113), Dec. 5, 2019.

* cited by examiner

DEVICE FOR MULTIPOLE PHASE DIVISION DEMULTIPLEXING/MULTIPLEXING AND SPATIAL DIVISION TELECOMMUNICATIONS SYSTEM THEREOF

BACKGROUND

Technical Field

The present disclosure generally relates to the telecommunications field, such as optical communications.

More in particular, the disclosure concerns a device (such as an optical device) for multipole phase division demultiplexing/multiplexing and a spatial division communication system (such as an optical communication system) comprising the demultiplexing and/or multiplexing device.

Description of the Related Art

Space Division Multiplexing (SDM) has experienced an upsurge of research interest, both in academia and industry, as a possible means to address the ever increasing worldwide demand for bandwidth.

In particular, an implementation of SDM exploiting a set of mutually orthogonal spatial modes, in the so-called Mode Division Multiplexing (MDM), has been considered both for free-space and guided propagation, in which independent channels are carried by coaxially propagating and spatially overlapping modes with the same frequency, therefore improving the spectral efficiency and information capacity of the optical link, proportionally to the number of modes transmitted.

Among all the different families of orthogonal modal basis, beams carrying orbital angular momentum (OAM) of light have been demonstrated to provide promising candidates for MDM in the optical range, both in free-space and optical fiber propagation.

Among all the optical methods to perform the multiplexing and sorting of OAM beams, one of the most efficient and exploited is based on the log-pol conformal transformation mapping between orbital angular momentum and linear momentum states: the azimuthal phase gradients of OAM beams are unwrapped into tilted plane waves, which can be easily separated or focused by using a Fourier lens.

Conformal mappings provide an efficient method to perform unitary operations on optical beams and are carried out by using a sequence of two confocal phase plates: the first element, the beam transformer, imparts the desired transformation to the input beam, while the second element, the phase corrector, compensates for phase-distortions due to the propagation, and performs the inverse optical transformation when the same system is illuminated in reverse.

In general, for a given conformal transformation, it could be worth understanding what is the family of beams which is mapped to linear momentum states. If such a family of beams exits, then it holds the correspondence between the conformal map and the family of beams that can be exploited to perform SDM.

A circular-sector transformation has been recently introduced to perform optical operations on OAM beams, in the specific multiplication and division, in the following documents:

Takashima, S., Kobayashi, H., and Iwashita, K. Integer Multiplier for Orbital Angular Momentum of Light using Circular-Sector Transformation. *Phys. Rev. A* 100(6), 063822 (2019);

Ruffato, G., Massari, M., and Romanato, F. Multiplication and division of the orbital angular momentum of light with diffractive transformation optics. *Light: Sci. & Appl.* 8 (113), 2019.

The circular-sector transformation performs the mapping of the azimuthal angle $\vartheta$ to the scaled value $\vartheta/n$, n being an integer (scaling factor), while the radial coordinate r undergoes the power scaling $r^{1/n}$; when illuminated by an azimuthal phase gradient, as that carried by an OAM beam, an n-fold circular-sector transformation performs the projection of the whole phase onto a circular sector of amplitude $2\pi/|n|$ (plus an inversion if n<0), then by properly combining many transformations it is possible to perform the multiplication or division of OAM in an efficient manner.

In the context of electron beams, these transformations have been recently demonstrated to linearize the phase of a single electron beam which interacted with a magnetic or electric multipole, allowing to infer the strength and orientation of the interacting sources (see Ruffato, G., Rotunno, E., and Grillo, V. A general framework for conformal transformations in electron optics. arXiv preprint 2003.09635 (2020)).

Therefore there is the need to perform spatial division demultiplexing/multiplexing efficiently, with high-resolution and more flexibility, acting on a superposition of different beams.

BRIEF SUMMARY

One embodiment of the present disclosure relates to a device for demultiplexing/multiplexing multipole phase beams as defined in the enclosed claims and by their preferred embodiments disclosed in the enclosed dependent claims.

The basic idea is to perform spatial division demultiplexing/multiplexing of electromagnetic beams (for example, optical beams) endowed with multipole phase patterns with different phase strengths and/or different orientation angles using a conformal mapping of a circular-sector transformation type.

The demultiplexing device (for example, an optical device) is configured to receive at the input a superposition of a plurality of electromagnetic beams (for example, optical beams) carrying multipole phases with different phase strength and/or different orientation angle, and it is configured to generate therefrom at the output a corresponding plurality of electromagnetic beams having different radial and/or angular directions in the space depending on the different phase strengths and/or different orientation angles (in the case of a demultiplexing optical device, it generates at the output a constellation of distinct luminous spots in the far-field).

In particular, the demultiplexing device performs a circular-sector transformation on an input electromagnetic beam (for example, an optical beam) carrying a plurality of electromagnetic beams endowed with multipole phases, the circular-sector transformation performing the mapping between the multipole phases and tilted linear phases which can be sorted by means of a focusing element (such a lens performing an optical Fourier transform, in the example of the demultiplexing optical device) or by means of a focusing phase term.

In fact, multipole phases of order m are transformed efficiently into linear phases by means of a conformal mapping described by a n-fold circular-sector transformation with n=−1/m, then the linear phases can be easily separated using a focusing element (such as a lens in the example of the demultiplexing optical device) or by means of a focusing phase term.

A proper choice of the values of the phase strengths and orientation angles of the multipole phase beams allows to minimize the superposition of the corresponding luminous spots in the far-field in the example of the demultiplexing optical device, thus reducing the cross-talk between the different channels to be lower than a selected threshold, for example equal to −15 dB; in other words, in the example of the demultiplexing optical device the set of the values of the phase strengths and orientation angles of the multipole phase beams must be chosen suitably so that the luminous spots in the far-field do not overlap each other.

Electromagnetic beams, in particular optical beams, endowed with multipole phases of order m=2 are particularly advantageous, because they are the only class of multipole phase beams which maintain their phase structure in the far field and thus provide the ideal carriers to implement an SDM telecom link.

The same scheme works as a multiplexer when exploited in reverse configuration.

Therefore the multiplexing device is configured to receive at the input distinct electromagnetic beams and it is configured to generate therefrom at the output a superposition of collimated electromagnetic beams carrying multipole phases with different phase strengths and/or different orientation angles.

With respect to the mode-division multiplexing technique based on the log-pol transformation of OAM beams, the multipole-phase division of the present disclosure reveals a more versatile implementation of the demultiplexing/multiplexing devices and opens to a wider range of degrees of freedom.

In fact, while OAM beams are usually labeled by an integer number denoting the carried OAM value, the parameters used to define the multipole phase of a given order m, i.e. its phase strength $\alpha$ and rotation angle $\vartheta_0$ on a plane perpendicular to the propagation direction of the multipole phase electromagnetic beams, are continuous variables and the only constraint on their choice is to avoid the overlapping between the bright spots in far field originated by the corresponding channels.

In addition, while in OAM multiplexing the output spots are arranged over a fixed linear direction, in multipole-phase division multiplexing the angular degree of freedom allows to cover the whole plane and to distribute the channels over a two-dimensional space.

Furthermore, the output spots of the demultiplexing process present a Gaussian-like intensity profile, avoiding the need for cumbersome beam reshaping as in the case of the log-pol mapping for OAM beams; this is even more advantageous in the multiplexer design, since the output beam of a standard source can illuminate the optics directly without the need of beam reshaping.

Moreover, a crucial difference with respect to OAM modes is the absence of a phase singularity on the optical axis.

An immediate application of the spatial division multiplexing/demultiplexing technique of the disclosure is in the framework of data centres, where graded-index fibers (having low modal dispersion and the self-imaging properties) are already deployed and the maximum distance lengths are around a few kilometers.

Another embodiment of the present disclosure is a spatial division communication system as defined in the enclosed claims.

BRIEF DESCRIPTION OF THE SEVERAL VIEWS OF THE DRAWINGS

Further characteristics and advantages of the disclosure will emerge from the following description of a preferred embodiment and variants thereof, said description being provided by way of example with reference to the enclosed drawings, wherein.

DETAILED DESCRIPTION

It should be noted that in the description that follows identical or similar blocks, components or modules have the same reference numerals, regardless of whether they are shown in different embodiments of the disclosure.

Theory About Multipole Phase Division Demultiplexing

An n-fold circular-sector transformation performs the mapping between two polar reference frames (r, $\vartheta$) and ($\rho$, $\varphi$), linked by the following coordinate change:

$$\begin{cases} \varphi = \dfrac{\vartheta}{n} \\ \rho = a\left(\dfrac{r}{b}\right)^{-\frac{1}{n}} \end{cases} \quad (1)$$

where a and b are free scaling parameters.

The circular-sector transformation performs substantially a scaling on the azimuthal coordinate by a factor n, while the power scaling on the radial coordinate is dictated by the Cauchy-Riemann conditions that the transformation must satisfy in order to implement a conformal mapping.

In the paraxial approximation, the propagation of an input beam $U^{(i)}$ at a distance z, after illuminating a phase plate (indicated in the following with "beam transformer 2") with transmission function exp (i$\Omega$) located at z=0, is described by the Fresnel integral:

$$U(\rho, \varphi, z) = \dfrac{e^{ik\frac{\rho^2}{2z}}}{i\lambda z} \int\int U^{(i)}(r, \vartheta) e^{i\Omega(r,\vartheta)} e^{ik\frac{r^2}{2z}} e^{-ik\frac{r\rho}{z}\cos(\vartheta-\varphi)} r\, dr\, d\vartheta \quad (2)$$

By applying the stationary phase approximation to the previous integral, we find the condition on the phase function in order to impart the desired optical transformation $\rho(r)$ on the input beam:

$$\nabla \Omega_n = \dfrac{k}{z}\rho - \dfrac{k}{z}\left(1 - \dfrac{z}{f}\right)r \quad (3)$$

where we assumed that the phase function $\Omega$ in Eq. (2) is described as the sum of two contributions:

$$\Omega(r, \vartheta) = \Omega_n(r, \vartheta) - k\frac{r^2}{2f} \quad (4)$$

After substituting Eqs. (1) in Eq. (3) and solving for z=f, the following expression for the phase term $\Omega_n$ is obtained:

$$\Omega_n(r, \vartheta) = \frac{2\pi ab}{\lambda f}\left(\frac{r}{b}\right)^{1-\frac{1}{n}} \frac{\cos\left(\left(1-\frac{1}{n}\right)\vartheta\right)}{1-\frac{1}{n}} \quad (5)$$

Actually, a second phase plate (indicated in the following with "phase corrector 3") is required in z=f in order to complete the transformation and account for the phase distortions due to propagation.

The required phase pattern exhibits the same functional dependence as in Eq. (5), under the substitutions n→1/n and a↔b (plus a quadratic focusing term as in Eq. (4) to introduce a Fresnel correction).

As a matter of fact, this second element performs the inverse transformation when the optical system is illuminated in reverse, i.e. a circular-sector transformation by a scaling factor 1/n.

Analogous calculations can be performed considering the formulation of Eq.(2) in the non-paraxial regime, obtaining the corresponding expressions for the elements 2 and 3 beyond the paraxial approximation.

Now we look for an output beam that after being transmitted through the sequence of beam transformer and phase corrector holds a linear phase gradient:

$$\Phi^{out}(\rho, \varphi) = \beta\rho \cos(\varphi-\varphi_0) \quad (6)$$

Then, after substituting the relations in Eqs. (1), we find that the phase in Eq. (6) originates from the input phase term:

$$\Phi^{in}(r, \vartheta) = \alpha r^m \cos(m(\vartheta-\vartheta_0)) \quad (7)$$

with the definitions m=−1/n, α=βa/b$^{-1/n}$ and $\vartheta_0$=$\varphi_0$.

Eq. (7) describes a multipole-phase pattern of order m with strength α, forming an angle $\vartheta_0$ with respect to the positive x-axis ($\vartheta$=0).

By introducing an additional angular rotation of π/2 to the argument of the cosine function in Eq. (6), Eq.(6) and Eq.(7) can be expressed using the sine function: $\Phi^{out}(\rho, \varphi)$=βρ sin ($\varphi-\varphi_0$), $\Phi^{in}(r, \vartheta)$=αr$^m$ sin (m($\vartheta-\vartheta_0$)). Hereinafter we will consider the expressions with cosine function without loss of generality.

We define as multipole phase beam an electromagnetic beam endowed with a phase term as that given by Eq. (7).

For instance, the electromagnetic beam can have a Gaussian intensity distribution, then the associated field is proportional to:

$$U(r, \vartheta) = C \exp(-r^2/w_0^2)\exp(i\alpha r^m \cos(m(\vartheta-\vartheta_0))) \quad (8)$$

where $w_0$ is the beam waist radius, (r, $\vartheta$) is a coordinate system on a plane perpendicular to the propagation direction and centered on the propagation axis.

As a straightforward consequence of the previous result, an input multipole-phase term of order m that is rotated by an angle $\vartheta_0$ on the plane can be transformed into a linear phase gradient by applying a circular-sector transformation with a scaling factor n, being n=−1/m.

According to Eq. (5), the first and second phase elements, i.e. the beam transformer and the phase corrector, required to perform the transformation are given by:

$$\Omega_{1,m}^D(r, \vartheta) = \frac{2\pi ab}{\lambda f}\left(\frac{r}{b}\right)^{1+m} \frac{\cos((1+m)\vartheta)}{1+m} \quad (9)$$

$$\Omega_{2,m}^D(\rho, \varphi) = \frac{2\pi ab}{\lambda f}\left(\frac{\rho}{a}\right)^{1+\frac{1}{m}} \frac{\cos\left(\left(1+\frac{1}{m}\right)\varphi\right)}{1+\frac{1}{m}} \quad (10)$$

Beams endowed with different values of strength α and/or angle $\vartheta_0$ are quasi-orthogonal. They can be propagated independently conserving the different values of strengths α and/or angle $\vartheta_0$. Then considering the optical demultiplexing application, after placing a lens in cascade to the second element in f-f configuration, a bright spot is expected on its back focal plane at the polar coordinates:

$$\begin{cases} \theta = -m\vartheta_0 \\ R = \frac{f_F}{k}\frac{\alpha b^m}{a} \end{cases} \quad (11)$$

being $f_F$ the focal length.

The values of strength α, and angle $\vartheta_0$ allow to control the position of the output beam. Therefore optical beams endowed with multipole phases of the same order m, but with different phase strengths and orientation angles, can be mapped onto distinct points in far field by using an n-fold circular-sector transformation with n=−1/m as a sorter. In other words, the sequence of beam transformer and phase corrector allows to perform the demultiplexing function.

The phase patterns in Eqs. (9) and (10) have been calculated in the stationary phase approximation for planar wavefronts, then they are expected to work perfectly only for collimated beams in input.

Irrespective of their divergence, beams carrying multipole phases are not plane waves, and the local deviation due to the structured phase front is equal to $|\nabla\Phi^{(in)}|/k$.

However, the optical transformation still works as expected, provided that the angular deviation introduced by the transformer, given by $|\nabla\Omega_n|/k$, dominates over any input deviation from normal incidence.

For a given multipole order m, it is required that $|\nabla\Phi^{(in)}|<<|\nabla\Omega_{-1/m}|$, providing the condition α<<$\alpha_{MAX}$ =kaw$_0$/(fmb$^m$), where w$_0$ is the waist radius of the input beam.

Figure 1:
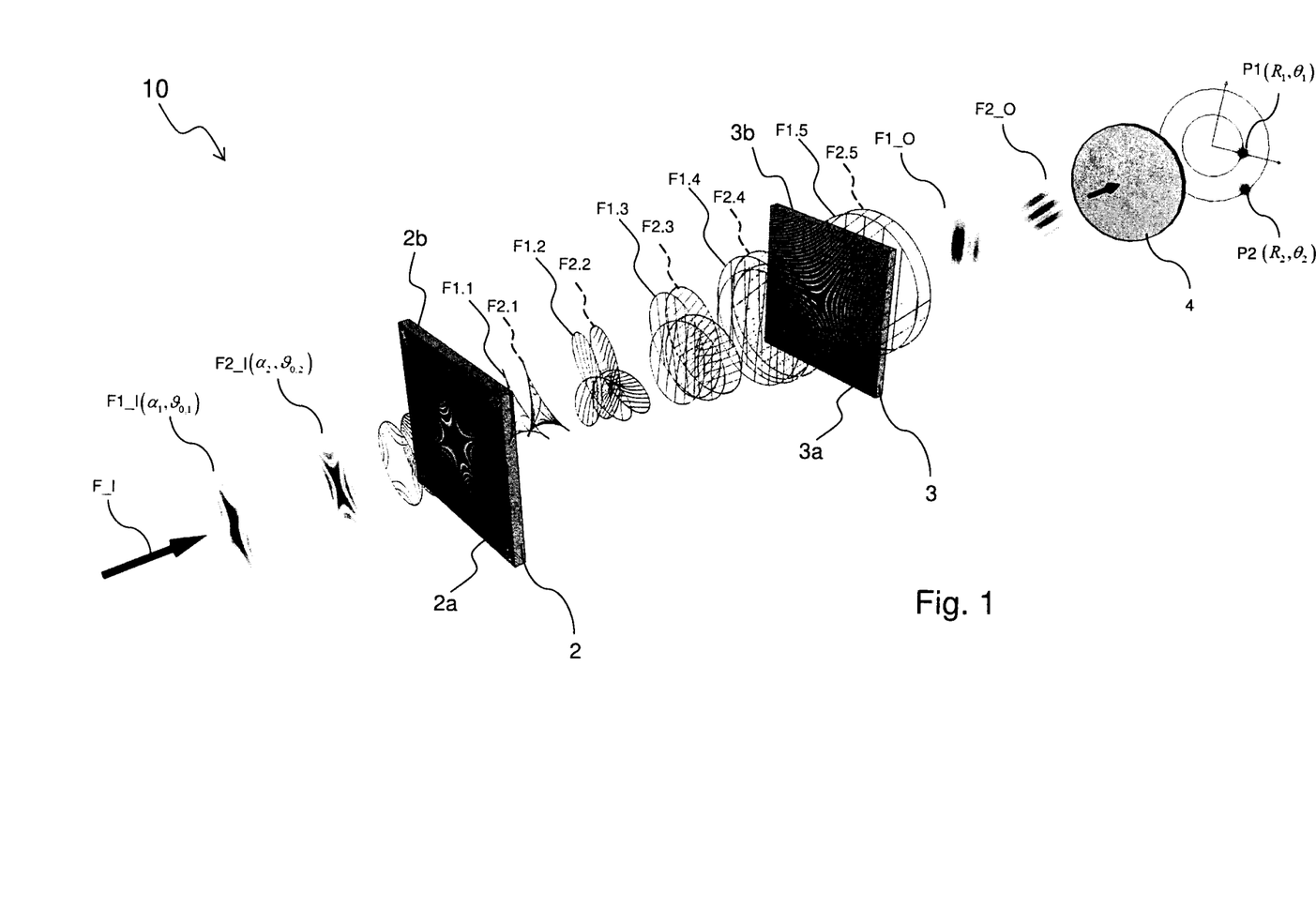
FIG. 1 schematically shows an optical device for multipole phase division demultiplexing according to the disclosure.

In order to explain the disclosure, in the following optical wavelengths are considered having a range of wavelengths comprised between 100 nanometers and 1 millimeter and thus the device 10 of FIG. 1 is a demultiplexing optical device receiving an input optical beam F_I from a free space communication or from an optical fiber communication carrying a multiplexed guided optical beams with multipole phases: in this last case the demultiplexing optical device 10 is coupled at the input with a fiber connector and the input optical beam F_I is generated at the output facet of the optical fiber. For "free-space communication" it is intended the propagation through a transparent medium, for instance vacuum, air or water.

More in general, the disclosure is not limited to the optical wavelengths and it can be used also in other wavelengths ranges, so that in general the input beam F_I is an electromagnetic beam.

For example, the disclosure is also applicable to:
 microwave wavelengths, so that the electromagnetic beam F_I is a microwave radiation having a wavelengths range comprised between 0.1 centimeters and 100 centimeters (i.e. frequencies range comprised between about 300 Mhz and about 300 GHz);

radio wavelengths, so that the electromagnetic beam F_I is a radio wave having wavelengths comprised between 1 millimeter and 100 meters.

Moreover, for the sake of simplicity in FIG. 1 two multipole phase beams F_I, F2_I are considered, but more in general the demultiplexing optical device 10 performs demultiplexing of a plurality N of multipole phase beams, where N is an integer number greater than or equal to 2.

Referring to FIG. 1, it shows a demultiplexing optical device 10 according to the disclosure for optics application.

The demultiplexing optical device 10 performs the demultiplexing of a multiplexed input optical beam F_I (having for example a Gaussian intensity profile) carrying a superposition of two optical beams F1_I, F2_I having the same frequency, wherein the two optical beams F1_I, F2_I are endowed with multipole phase patterns of the same order m (in particular, m=2), but with different phase strength a and/or different orientation angle $\vartheta_0$ over a plane perpendicular to the propagation direction of the multiplexed input optical beam F_I (which is the same as the propagation direction of the two multipole phases optical beams F1_I, F2_I).

The term "different phase strength α and/or different orientation angle $\vartheta_0$" includes the following alternative solutions:

the phase strength $\alpha_1$ of the first optical beam F1_I is different from the phase strength α2 of the second optical beam F2_I, and the angular orientation $\vartheta_{0,1}$ of the first optical beam F1_I is different from the angular orientation $\vartheta_{0,2}$ of the second optical beam F2_I;

the phase strength $\alpha_1$ of the first optical beam F1_I is equal to the phase strength $\alpha_2$ of the second optical beam F2_I, and the angular orientation $\vartheta_{0,1}$ of the first optical beam F1_I is different from the angular orientation $\vartheta_{0,2}$ of the second optical beam F2_I;

the phase strength ai of the first optical beam F1_I is different from the phase strength $\alpha_2$ of the second optical beam F2_I, and the angular orientation $\vartheta_{0,1}$ of the first optical beam F1_I is equal to the angular orientation $\vartheta_{0,2}$ of the second optical beam F2_I.

Multipole-phase beams are not modes in the strict sense, hence they do not preserve they intensity/phase structure during their free-space propagation; however, their far-field phase pattern still maintains a multipole-phase structure, and a multipole phase of order m is Fourier transformed under propagation into the order m/(m−1).

As far as propagation in fibre is concerned, beams with multipole phases are not exact solutions of the wave equation in the medium, then they should be described in terms of superposition of the fibre modes, with a consequent distortion of the input phase and intensity distributions due to modal dispersion.

On the other hand, due to the low modal dispersion and the self-imaging properties, graded-index fibres are expected to represent the best candidate for multipole-phase beams transmission.

As a matter of fact, the optical field at any point inside the fiber can be written without any reference to the fiber modes as a two-dimensional integration over the input field in a manner similar to what expressed for diffraction theory. Then, the input field is reproduced periodically inside the fiber and can be propagated at the other end.

For this reason, an immediate application of this spatial division multiplexing technique could be found in the framework of data centres, where graded-index fibers are already deployed and the maximum distance length are around a few kilometers.

The particular case of multipole phases of order m=+2 resembles the pattern of the well-known 2-fold astigmatisms. Then, the present disclosure offers a solution to measure the amount and orientation of astigmatisms in a fast and direct way, and analogous demultiplexers can be designed for higher order aberrations described by multipole phases with positive integer m (m-fold astigmatism).

The demultiplexing optical device 10 includes a cascade of a beam transformer implemented with a first diffractive optical element 2 and of a phase corrector implemented with a second diffractive optical element 3.

Moreover, the demultiplexing optical device 10 further includes a focusing optical element 4 arranged in cascade to the second diffractive optical element 3.

The first diffractive optical element 2 is confocal with the second diffractive optical element 3.

The demultiplexing optical device 10 receives at the input a superposition of the two multipole phase optical beams F1_I and F2_I, then the demultiplexing optical device 10 generates at the output two plane waves F_O, F2_O which are tilted with respect to the propagation direction of the input two multipole phase optical beams F1_I and F2_I, then the two tilted plane waves are sorted by the focusing element 4 generating two different luminous spots in far-field having different radial and/or angular positions which depend on the two different phase strengths and/or different orientations angles at the input of the demultiplexing optical device 10.

The set of the first and second diffractive optical elements 2, 3 performs the conversion of the input multipole phase gradient into a linear phase gradient (i.e. a phase linearization process occurs), by means of a conformal mapping of a circular-sector transformation type, which transforms the two multipole phase beams F1_I, F2_I at the input into two tilted plane waves F1_O, F2_O at the output of the second diffractive optical element 3, which are sorted with the focusing element 4, such as a focusing lens implementing a Fourier transform.

Therefore a sequence of a circular-sector transformation and of a Fourier transform is able to perform the demultiplexing of multipole phase beams.

In particular, the first multipole phase optical beam F1_I carries a first phase strength $\alpha_1$ and a first orientation angle $\vartheta_{0,1}$ on a plane perpendicular to the propagation direction of the first multipole phase optical beam F1_I, while the second multipole phase optical beam F2_I carries a second phase strength $\alpha_2$ and a second orientation angle $\vartheta_{0,2}$ on a plane perpendicular to the propagation direction of the second multipole phase optical beam F2_I.

For example, the values of the phase strengths $\alpha_1$, $\alpha_2$ are comprised between 0 and a maximum threshold value $\alpha_{MAX}$ defined by the design parameters of the circular-sector transformation (the parameters a, b, f), while the values of the orientation angles $\vartheta_{0,1}$, $\vartheta_{0,2}$ are comprised between 0 and π (in the case m=2, otherwise they are comprised between 0 and 2π/m), in case of m=2, $\alpha_{MAX}=\pi a w_0/(\lambda f b^2)$, where $w_0$ and λ are the waist radius and wavelength of the input beams.

The multipole phase term of the first multipole phase optical beam F1_I is the following:

$$\Phi_1 = \alpha_1 r^2 \cos(2(\vartheta - \vartheta_{0,1})) \quad (12)$$

wherein:
- (r, ϑ) are polar coordinates on a plane perpendicular to the propagation direction of the multiplexed input optical beam F_I, r being the radial coordinate and ϑ the angular coordinate;
- $\alpha_1$ is the phase strength of the first input multipole phase optical beam F1_I;
- $\vartheta_{0,1}$ is the orientation angle of the first input multipole phase optical beam F1_I, with respect to a positive x-axis (i.e. the multipole phase term is rotated by $\vartheta_{0,1}$ on the plane (r, ϑ));

Similarly, the multipole phase term of the second multipole phase optical beam F2_I is the following:

$$\Phi_2 = \alpha_2 r^2 \cos(2(\vartheta - \vartheta_{0,2})) \tag{13}$$

wherein:
- $\alpha_2$ is the phase strength of the second input multipole phase optical beam F2_1;
- $\vartheta_{0,2}$ is the orientation angle of the second input multipole phase optical beam F2_I with respect to a positive x-axis (i.e. the multipole phase term is rotated by $\vartheta_{0,2}$ on the plane (r, ϑ));

The first diffractive optical element 2 is a beam transformer performing a transformation of the phase and intensity pattern of the impinging optical beam.

In particular, the first diffractive optical element 2 has the function of imparting a circular-sector transformation with n=−1/m, transforming multipole phase patterns of order m into linear phase patterns.

For example, m=2 and thus the first diffractive optical element 2 imparts a circular-sector transformation with n=−1/2.

The transmission function of the first diffractive optical element 2 has the following phase term:

$$\Omega_1 = \frac{2\pi ab}{\lambda f} \left(\frac{r}{b}\right)^3 \frac{\cos(3\vartheta)}{3} \tag{14}$$

wherein:
- (r, ϑ) are polar coordinates on the plane associated to the first diffractive optical element 2, r being the radial coordinate and ϑ the angular coordinate;
- f is the distance between the first diffractive element 2 and the second diffractive element 3;
- λ is the wavelength of the input optical beam F_I (which is equal to the wavelength of the two multipole phase beams F1_I, F2_I),
- a and b design parameters.

The first diffractive optical element 2 receives at the input the two multipole phase optical beams F1_I, F2_I (for example, of order m), performs a n-fold circular-sector transformation and generates therefrom at the output two transforming optical beams F1.1, F2.1.

The two transforming optical beams F1.1, F2.1 propagate in a medium towards the second diffractive optical element 3 and transform, generating two transformed optical beams F1.4, F2.4: FIG. 1 schematically shows the lines of equal phase of the phasefronts of the two transformed optical beams at subsequent distances from first diffractive optical element 2, indicated with F1.2, F2.2 at a first distance, F1.3, F2.3 at a second distance (greater than the first distance) and F1.4, F2.4 at a third distance (greater than the second distance and close to the second diffractive optical element 3).

The two propagated transformed optical beams F1.4, F2.4 impinge on the second diffractive optical element 3.

In one embodiment, the first diffractive optical element 2 is a plate having two surfaces 2a, 2b which are substantially planar and substantially parallel to each other as shown in FIG. 1, wherein the multiplexed input beam F_I impinges on the first surface 2a and the second surface 2b is configured to generate the two transforming optical beams F1.1, F2.1, the term "substantially planar surface" means that the diffractive optical element 2 is patterned at nanometric scale, but it can be considered effectively planar by the multiplexed input beam F_I at millimetric scale.

The second diffractive optical element 3 is a phase corrector compensating for phase-distortions of optical beams due to the propagation between the first diffractive optical element 2 and the second diffractive optical element 3, so that a linear phase gradient is retained after the second diffractive optical element 3.

The transmission function of the second diffractive optical element 3 has the following phase term:

$$\Omega_2 = \frac{2\pi ab}{\lambda f} \left(\frac{\rho}{a}\right)^{3/2} \frac{\cos(3\varphi/2)}{3/2} \tag{15}$$

wherein:
- (ρ, φ) are polar coordinates on a plane associated to the second diffractive optical element 3, ρ being the radial coordinate and φ the angular coordinate;
- f is the distance between the first diffractive optical element 2 and the second diffractive optical element 3;
- λ is the wavelength of the input optical beam F_I (for example 632.8 nanometers);
- a and b design parameters (for example, a=500 micrometers, b=300 micrometers), the same of the diffractive optical element 2.

In one embodiment, the second optical element 3 is a plate having two surfaces 3a, 3b which are substantially planar and substantially parallel to each other as shown in FIG. 1, wherein the two propagated transformed optical beams F.4, F2.4 impinge on the first surface 3-1 and the second surface 3-2 is configured to generate the two phase-corrected optical beams F1.5, F2.5.

The second diffractive optical element 3 receives at the input the two propagated transformed optical beams F1.14, F2.4 with distorted phase patterns, then the second diffractive optical element 3 performs a phase correction of the two propagated transformed optical beams F1.4, F2.4 and generates therefrom at the output two phase-corrected optical beams F1.5, F2.5 having different radial and/or angular directions in the space (off-axis) depending on the different phase strengths $\alpha_1$, $\alpha_2$ and/or different orientation angles $\vartheta_{0,1}$, $\vartheta_{0,2}$ of the two multipole phase optical beams F1_I, F2_I received at the input of the optical demultiplexing device 10.

In other words, the two phase-corrected optical beams F1.5, F2.5 at the output of the second diffractive optical element 3 separate along a transverse direction according to the phase strength and/or orientation angle values of the corresponding multipole phase optical beams F1_I, F2_I, that is:
- the first phase-corrected optical beam F1.5($\alpha_1$, $\vartheta_{0,1}$) has a first direction in the space (measured as radial and angular direction) depending on the phase strength $\alpha_1$ and on the orientation angle $\vartheta_{0,1}$ of the input multipole phase optical beam F1_I.
- the second phase-corrected optical beam F2.5($\alpha_2$, $\vartheta_{0,2}$) has a second direction (different from the first direction) in the space (measured as radial and angular direction) depending on the phase strength az and on orientation angle $\vartheta_{0,2}$ of the input multipole phase optical beam F2_I.

According to a first embodiment of the disclosure, the phase pattern of the first diffractive optical element 2 further includes a focusing term for focusing the two transformed optical beams F1.4, F2.4 on the second element 3 (implemented with a second diffractive optical element), and the phase pattern of the second diffractive optical element 3 further includes a focusing term for collimating the plurality of phase-corrected electromagnetic beams F1.5, F2.5.

In particular, the phase pattern of the focusing term of the first diffractive optical element 2 is $\Omega_f = -kr^2/(2f)$, k being equal to $2\pi/\lambda$, and the phase pattern of the focusing term of the second diffractive optical element 3 is $\Omega_f = -k\rho^2/(2f)$.

Alternatively, a focusing element is interposed between the first diffractive optical element 2 and the second diffractive optical element 3, the focusing element having a focal length f, wherein the distance between the focusing element and the first diffractive optical element 2 and the distance between the focusing element and the second diffractive optical element 3 is equal to f.

FIG. 1 shows that the beam transformer 2 and the phase corrector 3 are two different diffractive optical elements, but more in general the first and second optical elements 2 and 3 can be fabricated as diffractive optics or in a metasurface form and integrated into compact architectures.

According to an embodiment of the disclosure, the beam transformer 2 and the phase corrector 3 are two different diffractive optical elements, previously indicated with first diffractive optical element 2 and second diffractive optical element 3, respectively: in this case the two optical beams F1.1, F2.1 (generated at the output of the first diffractive optical element 2) transform during the propagation in a medium from the output of the first diffractive optical element 2 towards the second diffractive optical element 3, and FIG. 1 shows the phasefronts of the transforming optical beams indicated with F1.2, F2.2 at a first distance from the first diffractive optical element 2 with F1.3, F2.3 at a second distance (greater than the first distance) and with F1.4, F2.4 at a third distance (greater than the second distance and close to the second diffractive optical element 3), which finally become the propagated transformed optical beams F1.4, F2.4 impinging on the second diffractive optical element 3.

Alternatively, a substrate slab is interposed between the first diffractive optical element 2 and the second diffractive optical element 3 and the transforming optical beams F1.1, F2.1 at the output of the first diffractive optical element 2 propagate in the substrate slab and transform, till reaching the second diffractive optical element 3 as the propagated transformed optical beams F1.4, F2.4.

According to another embodiment of the disclosure, the beam transformer 2 and the phase corrector 3 are implemented with a substrate slab for example made of a glass material (i.e. a glass slide) transparent for the visible wavelengths or a silicon material transparent for the infra-red wavelengths: in this case the beam transformer 2 is implemented over a first surface of the substrate slab and the phase corrector 3 is implemented over a second surface of the same substrate slab (for example, two opposite surfaces of a substrate slab having the shape of a parallelepiped or cube).

The substrate slab of the demultiplexing optical device 10 can be a single block; alternatively, the substrate slab of the demultiplexing optical device 10 can be constituted by multiple layers made of two or more transparent slabs arranged in order to form a solid unique block.

The focusing element 4 is for example a focusing optical lens performing a Fourier-transform of the two phase-corrected optical beams (having different directions) into two parallel axially-shifted optical beams, thus completing the demultiplexing of the two input multipole phase optical beams F1_I, F2_I.

In particular, the two phase-corrected optical beams F1.5, F2.5 (generated at the output of the second optical element 3) propagate towards the focusing element 4 and after propagation are indicated in FIG. 1 with F1_O, F2_O and referred hereinafter with output optical beams.

The two output optical beams F1_O, F2_O impinge on the lens 4, which performs focusing of the two output optical beams F1_O, F2_O at different radial and angular positions of a photo-detector.

In particular, FIG. 1 shows that the first output optical beam F1_O is focused on a first luminous spot P1 at a first radial position $R_1$ and first angle $\theta_1$ over a plane defined on the planar surface of the photo-detector, while the second output optical beam F2_O is focused on a second luminous spot P2 at a second angular position $R_2$ and second angle $\theta_2$ (wherein radius $R_2$ is different from radius $R_1$ and wherein angle $\theta_2$ is different from angle $\theta_1$).

The formula of the luminous spot at the far-field position on the back focal plane of the lens 4 is the following:

$$\begin{cases} R_i = \dfrac{f_L}{k} \dfrac{\alpha_i b^2}{a} \\ \theta_i = -2\vartheta_{0,i} \end{cases} \qquad (16)$$

wherein:
- ($R_i$, $\theta_i$) are the polar coordinates (radius, angle), on the back focal plane, of the i-th luminous spot, where i stands for 1 or 2;
- $f_L$ is the focal length of the lens 4;
- $\alpha_i$ is the phase strength of the i-th input multipole phase optical beam Fi_I, where i stands for 1 or 2;
- $\vartheta_{0,1}$ is the orientation angle of the i-th input multipole phase optical beam Fi_I with respect to a positive x-axis (i.e. the multipole phase term is rotated by $\vartheta_{0,1}$ on the plane (r, $\vartheta$)), where i stands for 1 or 2;
- a and b are the design parameters of the optical elements 2 and 3;
- $k=2\pi/\lambda$, where $\lambda$ is the wavelength of the multiplexed input optical beam F_I.

Finally, the photo-detector performs an opto-electrical conversion of the two received optical beams at points P1, P2 into two respective electrical signals, thus completing the demultiplexing of the input multipole phase optical beams F1_I, F2_I.

FIG. 1 shows a separate focusing element 4 (lens) for performing the focusing of the two phase-corrected optical beams F1.5, F2.5 (generated at the output of the second diffractive optical element 3) over two different luminous spots on the photo-detector, but the focusing functionality can be achieved with other solutions.

According to another embodiment of the disclosure, the phase pattern of the second diffractive optical element 3 further includes a focusing term for focusing the two output optical beams F1_O, F2_O on the photo-detector.

In particular, the phase pattern of the focusing term of the second diffractive optical element 3 is $\Omega_f = -k\rho^2/(2f_L)$.

Theory about multipole phase division multiplexing

As already mentioned above, under the substitution n=−1/m, Eq. (9) and Eq. (10) provide the phase patterns of the sequence of optical elements, i.e. a beam transformer and a phase corrector, required to demultiplex a superposition of multipole-phase beams of order m:

$$\Omega_{1,m}^D(r, \vartheta) = \frac{2\pi ab}{\lambda f}\left(\frac{r}{b}\right)^{1+m}\frac{\cos((1+m)\vartheta)}{1+m} \quad (17)$$

$$\Omega_{2,m}^D(\rho, \varphi) = \frac{2\pi ab}{\lambda f}\left(\frac{\rho}{a}\right)^{1+\frac{1}{m}}\frac{\cos\left(\left(1+\frac{1}{m}\right)\varphi\right)}{1+\frac{1}{m}} \quad (18)$$

When illuminated in reverse, the same demultiplexer configuration can be used to multiplex several input beams into a collimated bunch of multipole phase beams with the same order m, but differing in phase strength and rotation on a plane perpendicular to the propagation direction: however, the first element of the multiplexer is not exactly the same as the second element in the demultiplexer (Eq. (10, 18)).

In fact, since the inverse transformation performs the mapping of the whole pattern onto a circular sector with amplitude 2π/|m|, then an |m|-fold multiplication of the input beam is needed in order to obtain a beam defined over the whole 2π range.

For this reason, the required phase turns out to be the combination of |m| phase patterns performing m-fold circular-sector transformations, rotated by 2π/|m| with respect to each other.

The phase pattern of the first element (i.e. the multiplier) is described by the combination:

$$\Omega_{1,m}^M(r, \vartheta) = \arg\left\{\sum_{p=1}^{|m|} e^{i\Omega_{2,m}^{D,(p)}}\right\} \quad (19)$$

where:

$$\Omega_{2,m}^{D,(p)}(r, \vartheta) = \frac{2\pi ab}{\lambda f}\left(\frac{r}{a}\right)^{1+\frac{1}{m}}\frac{\cos\left[\vartheta\left(1+\frac{1}{m}\right)+(p-1)\frac{2\pi}{|m|}\right]}{1+\frac{1}{m}} \quad (20)$$

while the second element is given again by Eq. (9, 17), that is $\Omega_{2,m}^M = \Omega_{1,m}^D$.

In other words, an input linear phase gradient is transformed into the desired phase by applying an m-fold multiplication with a sign inversion.

While the second element is equal to the first element of the demultiplexer, in this case the first element is given by the combination of am| phase elements (as the second element of the demultiplexer) rotated by 2/π|m|, as a result of Eqs. (19) and (20).

The phase strength and orientation angle of the output multipole phase beam can be controlled by acting properly on the input linear phase gradient, i.e. on the axial displacement of the input collimated beam illuminating the Fourier lens.

For a given radial position R and angular position θ of the collimated beam in input, a tilted beam is focused on the first optical element with a linear phase gradient $\Phi^{in}=Br\cos(\vartheta-\theta)$, where $B=kR/f_L$, $f_L$ is the focal length of the focusing element.

The multiplexer, i.e. the sequence of a beam transformer (i.e. a multiplier) and phase corrector described above, transforms the linear phase gradient in input into a multipole phase term $\Phi^{out}=\alpha\rho^m\cos(m(\varphi-\vartheta_0))$, where $$\begin{cases}\vartheta_0 = -\frac{\theta}{m} \\ \alpha = \frac{k}{f_F}\frac{aR}{b^m}\end{cases} \quad (21)$$

In order to prove the described framework, we limit our analysis to the specific case m=+2.

We consider a set of collimated beams in input at the positions $(R_j, \theta_j)$ entering the focusing element: they are focused on the first element (i.e. the multiplier) as a set of respective tilted beams having linear phase gradients:

$$\Phi_j^{in}(r, \vartheta)=B_j r\cos(\vartheta-\theta_j) \quad (22)$$

where $B_j=kR_j/f_L$, $f_L$ being the focal length of the lens.

After applying the multiplication with n=−m=−2, the following set of multipole phases is obtained in output:

$$\Phi_{2,j}^{out}(\rho, \varphi)=\alpha_j\rho^2\cos(2(\varphi-\vartheta_{0,j})) \quad (23)$$

where $\alpha_j=B_j a/b^2$ and $\vartheta_{0,j}=-\theta_j/2$.

Figure 2:
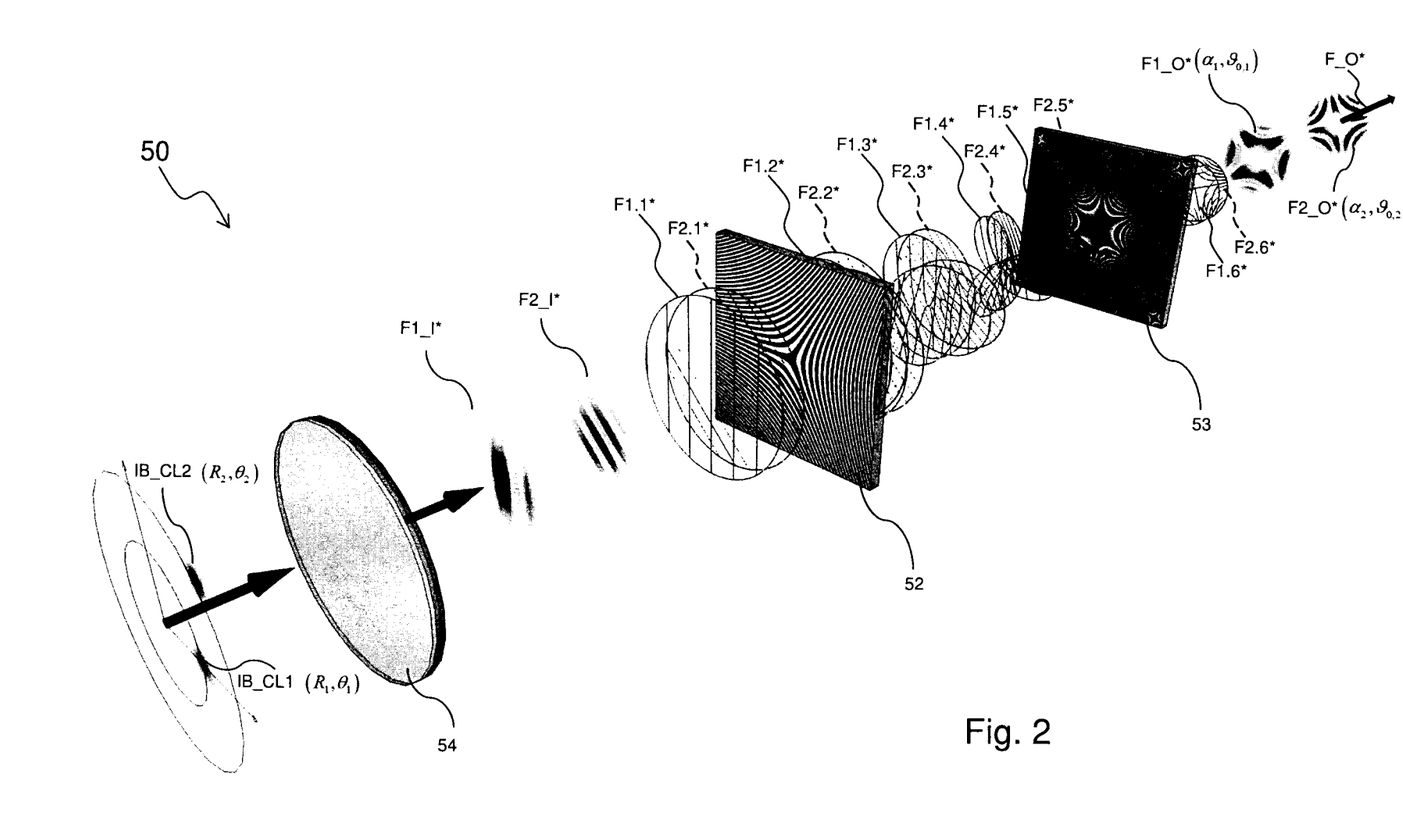
FIG. 2 schematically shows an optical device for multipole phase division multiplexing according to the disclosure.

Referring to FIG. 2, it shows a multiplexing optical device 50 according to the disclosure for the optical application.

The multiplexing optical device 50 performs the multiplexing of two multipole phase optical beams with different phase strengths $\alpha_1$, $\alpha_2$ and/or different orientation angles $\vartheta_{0,1}$, $\vartheta_{0,2}$ and insertion into a multi-mode optical fiber or collimation for free-space transmission in air or in any transparent medium (for instance water).

The multiplexing optical device 50 of FIG. 2 has a complementary function with respect to that of the demultiplexing optical device 10 of FIG. 1; it is described by analogy to the demultiplexing optical device 10, considering reciprocity by virtue of the symmetry linked to the time reversal invariance between the demultiplexing and multiplexing processes.

The multiplexing optical device 50 includes a cascade of a beam transformer 52 and of a phase corrector 53, wherein the phase corrector 53 is the same as the beam transformer 2 of the demultiplexing optical device 10, while the beam transformer 52 is different from the phase corrector 3 of the demultiplexing optical device 10.

In particular, the beam transformer 52 is implemented with a first diffractive optical element and the phase corrector 53 is implemented with a second diffractive optical element.

Moreover, the multiplexing optical device 50 further includes a focusing element 54, such as a lens.

The multiplexing optical device 50 receives at the input two collimated optical beams IB_CL1, IB_CL2 having the same frequencies range, which are generated for example from two respective laser sources.

The positions of the laser sources LS1, LS2 are $(R_1, \theta_1)$ and $(R_2, \theta_2)$, respectively, defined on the coordinates system $(R, \theta)$ defining the radial and angular positions of the laser source (polar coordinates) on a plane perpendicular to the propagation direction of the laser beams.

In particular, the first laser source LS1 has a first position defined by radial position $R_1$ and angular position $\theta_1$, while the second laser source LS2 has a second position defined by radial position $R_2$ and angular position $\theta_2$, wherein the first position is different from the second one as shown in FIG. 2.

The focusing element 54 (lens) performs the focusing of the two collimated input optical beams IB_CL1, IB_CL2 (generated from the laser sources LS1 and LS2) on the first diffractive optical element 52, generating two optical beams F1.1*, F2.1* which are tilted with respect to the direction perpendicular to a surface substantially planar defined by the first diffractive optical element 52, in particular the surface illuminated by the tilted optical beams F1.1\*, F2.1\*.

The term "substantially planar surface" means that the first diffractive optical element 52 is patterned at nanometric scale, but it can be considered effectively planar by the tilted optical beams F1.1\*, F2.1\* at millimetric scale.

In particular, the lens 54 performs an optical Fourier transform, mapping two collimated input optical beams IB_CL1, IB_CL2 into two corresponding tilted optical beams F1_I\*, F2_I\* with linear phase patterns, which propagate in a medium between the focusing element 54 and the first diffractive optical element 52 and then they illuminate the first diffractive optical element 52 wherein they are the two tilted optical beams F1.1\*, F2.1\* with linear phase.

For a given radial position R and angular position θ of the collimated beam, a tilted optical beam is focused on the first optical element 52 with a linear phase gradient $\Phi = Br \cos(\vartheta - \theta)$, where $B = kR/f_L$, $f_L$ is the focal length of the focusing element 54.

The phase term of the first tilted optical beam F1.1\* is the following:

$$\Phi_1^{in} = B_1 r \cos(\vartheta - \theta_1) \quad (24)$$

wherein:
- (r, ϑ) are polar coordinates on a plane associated to the first diffractive optical element 52, r being the radial coordinate and ϑ the angular coordinate;
- $B_1$ is the wavevector component, on the same reference frame, of the first tilted optical beam F1.1\*, and $B_1 = kR_1/f_L$, being $R_1$ the radial position of the first collimated input optical beam IB_CL1,
- $\theta_1$ is the angular position of the first collimated input optical beam IB_CL1.

The phase term of the second tilted optical beam F2.1\* is the following:

$$\Phi_2^{in} = B_2 r \cos(\varphi - \theta_2) \quad (25)$$

wherein:
- (r, ϑ) are polar coordinates on a plane associated to the first diffractive optical element 52, r being the radial coordinate and ϑ the angular coordinate;
- $B_2$ is the wavevector component, on the same reference frame, of the second tilted optical beam F2.1\*, and $B_2 = kR_2/f_L$, being $R_2$ the radial position of the second collimated input optical beam IB_CL2;
- $\theta_2$ is the angular position of the second collimated input optical beam IB_CL2.

The first diffractive optical element 52 is a beam transformer having the function of imparting an n-fold multiplication (i.e. it is a multiplier), transforming the linear phase patterns (of the two tilted optical beams F1.1\*, F2.1\* received at the input) into multipole phase patterns of order m=-n.

For example, in order to generate multipole phase patterns of order m=2 in output, the first diffractive optical element 52 imparts an n-fold multiplication with factor n=-2.

The transmission function of the first diffractive optical element 52 has the following phase term:

$$\Omega_1 = \arg\{\exp(i\Omega_1^{(1)}) + \exp(i\Omega_1^{(2)})\} \quad (26)$$

wherein:

$$\Omega_1^{(1)} = \frac{2\pi ab}{\lambda f}\left(\frac{r}{a}\right)^{3/2} \frac{\cos(3\vartheta/2)}{3/2} \quad (27)$$

$$\Omega_1^{(2)} = \frac{2\pi ab}{\lambda f}\left(\frac{r}{a}\right)^{3/2} \frac{\cos(3\vartheta/2 + \pi)}{3/2} \quad (28)$$

wherein:
- (r, ϑ) are polar coordinates on the plane associated to the first diffractive optical element 52, r being the radial coordinate and ϑ the angular coordinate;
- f is the distance between the first diffractive element 52 and the second diffractive element 53;
- λ is the wavelength of the collimated input optical beams;
- a and b are design parameters (for example, a=500 micrometers, b=300 micrometers).

The two transforming optical beams F1.2\*, F2.2\* (generated at the output of the first diffractive optical element 52) propagate in a medium towards the second diffractive optical element 53 and transform: FIG. 2 schematically shows the lines of equal phase of the phasefronts of the two transforming optical beams at subsequent distances from first diffractive optical element 52, indicated with transforming optical beams F1.3\*, F2.3\* at a first distance, with transforming optical beams F1.4\*, F2.4\* at a second distance (greater than the first distance) and with propagated transformed optical beams F1.5\*, F2.5\* at a third distance (greater than the second distance and close to the second diffractive optical element 53).

In one embodiment, the diffractive optical element 52 is a plate having two surfaces which are substantially planar and substantially parallel to each other as shown in FIG. 2 wherein the two tilted optical beams F1.1\*, F2.1\* impinge on the first surface and the second surface is configured to generate the two transforming optical beams F1.2\*, F2.2\*; the term "substantially planar surface" means that the diffractive optical element 52 is patterned at nanometric scale, but it can be considered effectively planar by the two tilted optical beams F1.1\*, F2.1\* at millimetric scale.

The second diffractive optical element 53 is a phase corrector compensating the phase distortion of the transformed optical beams F1.5\*, F2.5\* due to the propagation of the two transforming optical beams F1.2\*, F2.2\* between the first diffractive optical element 52 and the second diffractive optical element 53, so that a multipole phase pattern is retained after the second diffractive optical element 53.

The transmission function of the second diffractive optical element 53 has the following phase term:

$$\Omega_2 = \frac{2\pi ab}{\lambda f}\left(\frac{\rho}{b}\right)^3 \frac{\cos(3\varphi)}{3} \quad (29)$$

wherein:
- (ρ, φ) are polar coordinates on a plane associated to the second diffractive optical element 53, ρ being the radial coordinate and φ the angular coordinate;
- f is the distance between the first diffractive optical element 52 and the second diffractive optical element 53;
- λ is the wavelength of the collimated input optical beams (for example 632.8 nanometers);
- a and b design parameters (for example, a=500 micrometers, b=300 micrometers), the same of the first diffractive optical element 52.

The two propagated transformed optical beams F1.5\*, F2.5\* impinge on the second diffractive optical element 53 and the two propagated transformed optical beams F1.5\*, F2.5\* have distorted phase patterns due to the propagation of the two transforming optical beam F1.2*, F2.2* between the first diffractive optical element 52 and the second diffractive optical element b 53.

The second diffractive optical element 53 receives at the input the two propagated transformed optical beams F1.5*, F2.5* with distorted phase patterns, then the second diffractive optical element 53 performs a phase correction of the two propagated transformed optical beams F1.5*, F2.5* and generates therefrom at the output two phase-corrected optical beams F1.6*, F2.6* having multipole phase patterns with different phase strengths and/or different angular orientations depending on the different radial positions $R_1$, $R_2$ and/or different angular positions $\theta_1$, $\theta_2$ of the two collimated input optical beams IB_CL1, IB_CL2 at the input of the optical multiplexing device 50.

In other words, the two phase-corrected optical beams F1.6*, F2.6* at the output of the second diffractive optical element 53 have a multipole phase pattern of order m=−n, and different phase strength and/or different angular orientations, in particular:

the first phase-corrected optical beam F1.6* has a phase strength $\alpha_1 = a \cdot B_1/b^2$, and an orientation angle $\vartheta_{0,1} = -\theta_1/2$.

the second phase-corrected optical beam F2.6* has a phase strength $\alpha_2 = a \cdot B_2/b^2$, and an orientation angle $\vartheta_{0,2} = -\theta_2/2$.

The two phase-corrected multipole phase optical beams F1.6*, F2.6* at the output of the second diffractive optical element 53 propagate in a medium and generate two multipole phase optical beams F1_O*, F2_O* in far field whose superposition forms a multiplexed output optical beam F_O* which propagate in the free space or is injected into an optical fiber.

It is worth noting that FIG. 2 shows that the two far-field multipole phase optical beams F1_O*, F2_O* are distinct, but actually they are physically superimposed and represented by the single multiplexed output optical beam F_O*.

In one embodiment, the diffractive optical element 53 is a plate having two surfaces which are substantially planar and substantially parallel to each other as shown in FIG. 2 wherein the two propagated transformed optical beams F1.5*, F2.5* impinge on the first surface and the second surface is configured to generate the two phase-corrected multipole phase optical beams F1.6*, F2.6*; the term "substantially planar surface" means that the diffractive optical element 53 is patterned at nanometric scale, but it can be considered effectively planar by the two propagated transformed optical beams F1.5*, F2.5 at millimetric scale.

According to a first embodiment of the disclosure, the phase pattern of the first diffractive optical element 52 further includes a focusing term for focusing the two propagated transformed optical beams F1.5*, F2.5* on the second diffractive optical element 53 and the phase pattern of the second diffractive optical element 53 further includes a focusing term for collimating the plurality of phase-corrected electromagnetic beams F1.6*, F2.6*.

In particular, the phase pattern of the focusing term of the first diffractive optical element 52 is $\Omega_f = -kr^2/(2f)$, and the phase pattern of the focusing term of the second diffractive optical element 53 is $\Omega_f = -k\rho^2/(2f)$.

Alternatively, a focusing element is interposed between the first diffractive optical element 52 and the second diffractive optical element 53, the focusing element having a focal length f, wherein the distance between the focusing element and the first diffractive optical element 52 and the distance between the focusing element and the second diffractive optical element 53 is equal to f.

According to an embodiment of the disclosure, the beam transformer 52 and the phase corrector 53 are two different diffractive optical elements, previously indicated with first diffractive optical element 52 and second diffractive optical element 53, respectively: in this case the two transforming optical beams F1.2*, F2.2* (generated at the output of the first diffractive optical element 52) transform during the propagation in a medium (i.e. free-space propagation) from the output of the first diffractive optical element 52 towards the second diffractive optical element 53, and FIG. 2 shows the phasefronts of the two transforming optical beams indicated with F1.3*, F2.3* at a first distance from the first diffractive optical element 52 and with F1.4*, F2.4* at a second distance, which finally become the propagated transformed optical beams F1.5*, F2.5* impinging on the second diffractive optical element 53 at a third distance (greater than the second distance and close to the second diffractive optical element 53).

Alternatively, a substrate slab is interposed between the first diffractive optical element 52 and the second diffractive optical element 53 and the transforming optical beams F1.2*, F2.2* at the output of the first diffractive optical element 52 propagate in the substrate slab and transform, till reaching the second diffractive optical element 53 as the propagated transformed optical beams F1.5*, F2.5*.

The invention claimed is:

1. A device for multipole phase division demultiplexing, the device comprising:

a beam transformer and a phase corrector, wherein the beam transformer is configured to:
    receive an input electromagnetic beam carrying a plurality of electromagnetic beams endowed with multipole phase with equal order and different phase strengths and/or different orientation angles; and
    perform a circular-sector transformation conformal mapping of the plurality of multipole phase electromagnetic beams and generate therefrom a corresponding plurality of transformed electromagnetic beams;

wherein the phase corrector is configured to:
    receive the plurality of transformed electromagnetic beams; and
    perform a phase correction of the plurality of transformed electromagnetic beams and generate therefrom a plurality of phase-corrected electromagnetic beams with linear phase pattern, the plurality of phase-corrected electromagnetic beams having different radial directions and/or different angular directions in a space depending on the different phase strengths and/or different orientation angles of the plurality of received multipole phase electromagnetic beams.

2. The device according to claim 1, wherein each one of the plurality of multipole phase electromagnetic beams carries a multipole phase term of:

$$\Phi^{in}(r, \vartheta) = \alpha r^m \cos(m(\vartheta - \vartheta_0))$$

wherein:
    $(r, \vartheta)$ are polar coordinates over a plane perpendicular to a propagation direction of the plurality of multipole phase electromagnetic beams;
    $\alpha$ is a phase strength of each one of the plurality of multipole phase electromagnetic beams;
    $\vartheta_0$ is orientation angle of each one of the plurality of multipole phase electromagnetic beams; and
    m is the order of the plurality of multipole phase electromagnetic beams.

3. The device according to claim 1, wherein the plurality of electromagnetic beams are endowed with multipole phases with equal order m and the circular-sector transformation has a scaling factor n, wherein n=−1/m, m being an integer number with modulus greater than one, one included, in particular m=2 and n=−1/2.

4. The device according to claim 1, wherein the phase pattern of the beam transformer is:

$$\Omega_{1,m}^D(r,\vartheta) = \frac{2\pi ab}{\lambda f}\left(\frac{r}{b}\right)^{1+m}\frac{\cos((1+m)\vartheta)}{1+m}$$

wherein:
- (r, ϑ) are polar coordinates on a plane associated to the beam transformer, r being the radial coordinate and ϑ the angular coordinate;
- α and b are design parameters;
- m is the order of the plurality of multipole phase electromagnetic beams;
- $f$ is a distance between the beam transformer and the phase corrector;
- λ is a wavelength of the input electromagnetic beam; and the phase pattern of phase corrector is:

$$\Omega_{2,m}^D(\rho,\varphi) = \frac{2\pi ab}{\lambda f}\left(\frac{\rho}{a}\right)^{1+\frac{1}{m}}\frac{\cos\left(\left(1+\frac{1}{m}\right)\varphi\right)}{1+\frac{1}{m}}$$

wherein (ρ, φ) are polar coordinates on a plane associated to the phase corrector.

5. The device according to claim 4,
wherein the phase pattern of the beam transformer further includes a focusing term for focusing the plurality of transformed electromagnetic beams on the phase corrector, and
the phase pattern of the phase corrector further includes a focusing term for collimating the plurality of phase-corrected electromagnetic beams,
wherein the phase pattern of the focusing term of the beam transformer is $\Omega_f=-kr^2/(2f)$, k being equal to $2\pi/\lambda$, and
wherein the phase pattern of the focusing term of the phase corrector is $\Omega_f=-k\rho^2/(2f)$.

6. The device according to claim 4, further comprising a focusing element interposed between the beam transformer and the phase corrector, the focusing element having a focal length $f$, wherein the distance between the focusing element and the beam transformer and the distance between the focusing element and the phase corrector is equal to $f$.

7. The device according to claim 1, wherein a wavelengths range of the electromagnetic beams is selected from at least one of:
- optical wavelengths comprised between 100 nanometers and 1 millimeter;
- microwave wavelengths comprised between 0.1 centimeters and 100 centimeters; or
- radio wavelengths comprised between 1 mm and 100 meters.

8. The device according to claim 1, wherein a wavelengths ranges of the electromagnetic beams are comprised between 100 nanometers and 1 millimeter, wherein:
- the input electromagnetic beam is an input optical beam;
- the plurality of electromagnetic beams are a plurality of multipole phase optical beams;
- the beam transformer is a first diffractive optical element or a metasurface;
- the phase corrector is a second diffractive optical element or a metasurface;
- the plurality of transformed electromagnetic beams are transformed optical beams;
- the plurality of phase-corrected electromagnetic beams are a plurality of phase-corrected optical beams.

9. The device according to claim 8, further comprising a focusing lens and a photo-detector, wherein the focusing lens is configured to:
- receive the plurality of phase-corrected optical beams having different radial and/or angular directions in the space and generate therefrom at an output a corresponding plurality of axially-shifted optical beams; and
- focus the plurality of axially-shifted optical beams into a corresponding plurality of luminous spots having different radial and/or angular positions on a sensitive area of the photo-detector;

wherein the position of the luminous spots is:

$$\begin{cases} R_i = \frac{f_L}{k}\frac{\alpha_i b^m}{a} \\ \theta_i = -m\vartheta_{0,i} \end{cases}$$

wherein:
- ($R_i$, $\vartheta_i$) are the radial and angular positions in polar coordinates on a back-focal plane on the photo-detector of an i-th luminous spot;
- $f_L$ is a focal length of the focusing lens;
- $\vartheta_{0,i}$ is an angle of an i-th input multipole phase optical beam.

10. A device for multipole phase division multiplexing, the device comprising:
a beam transformer and a phase corrector,
wherein the beam transformer is configured to:
- receive a plurality of tilted electromagnetic beams with linear phase patterns and having different radial directions and/or different angular directions in a space; and
- perform a combination of |m| circular-sector transformations of the plurality of tilted electromagnetic beams and generate therefrom a plurality of transformed electromagnetic beams, wherein m is an integer number;

wherein the phase corrector is configured to:
- receive the plurality of transformed electromagnetic beams; and
- perform a phase correction of the received plurality of transformed electromagnetic beams, generating therefrom a plurality of phase-corrected electromagnetic beams endowed with multipole phase patterns with equal order m and different phase strengths and/or different orientation angles depending on the different radial directions and/or angular directions in the space of the plurality of input electromagnetic beams; and
- generate a multiplexed output electromagnetic beam carrying said plurality of phase-corrected multipole phase electromagnetic beams.

11. The device according to claim 10,
wherein each one of the plurality of phase-corrected multipole phase electromagnetic beams carries a multipole phase term of:

$$\Phi^{out} = \alpha \rho^m \cos(m(\varphi - \vartheta_0))$$

wherein:
(ρ, ϕ) are polar coordinates over a plane perpendicular to a propagation direction of the plurality of phase-corrected multipole phase electromagnetic beams;
α is a phase strength of each one of the plurality of phase-corrected multipole phase electromagnetic beams;
$\vartheta_0$ is an orientation angle of each one of the plurality of phase-corrected multipole phase electromagnetic beams.

12. The device according to claim 10, wherein the plurality of phase-corrected multipole phase electromagnetic beams are endowed with multipole phases with equal order m and the circular-sector transformations have a scaling factor n, wherein n=−m, m being an integer number with modulus greater than one, one included, in particular m=2 and n=−2.

13. The device according to claim 10, wherein the phase pattern of the beam transformer is described by the combination:

$$\Omega_{1,m}^{M}(r, \vartheta) = \arg\left\{\sum_{p=1}^{|m|} e^{i\Omega_{2,m}^{D,(p)}}\right\}$$

where:

$$\Omega_{2,m}^{D,(p)}(r, \vartheta) = \frac{2\pi ab}{\lambda f}\left(\frac{r}{a}\right)^{1+\frac{1}{m}} \frac{\cos\left[\vartheta\left(1+\frac{1}{m}\right) + (p-1)\frac{2\pi}{|m|}\right]}{1+\frac{1}{m}}$$

wherein:
(r, ϑ) are polar coordinates on a plane associated to the beam transformer, r being the radial coordinate and ϑ the angular coordinate;
m is the order of the plurality of phase-corrected multipole phase electromagnetic beams;
p is an integer number equal to 1, 2, ... |m|;
f is a distance between the beam transformer and the phase corrector;
λ is a wavelength of the tilted electromagnetic beams; and
α and b are design parameters;
wherein the phase pattern of the phase corrector is:

$$\Omega_{2,m}^{D}(\rho, \varphi) = \frac{2\pi ab}{\lambda f}\left(\frac{\rho}{a}\right)^{1+\frac{1}{m}} \frac{\cos\left(\left(1+\frac{1}{m}\right)\varphi\right)}{1+\frac{1}{m}}$$

wherein:
(ρ, φ) are polar coordinates on a plane associated to the phase corrector;
f is a distance between the beam transformer and the phase corrector;
λ is a wavelength of the tilted electromagnetic beams; and
α and b are design parameters.

14. The device according to claim 13,
wherein the phase pattern of the beam transformer further includes a focusing term for focusing the plurality of transformed electromagnetic beams on the phase corrector, and the phase pattern of the phase corrector further includes a focusing term for collimating the plurality of phase-corrected multipole phase electromagnetic beams,
wherein the phase pattern of the focusing term of the beam transformer is $\Omega_f = -kr^2/(2f)$, k being equal to $2\pi/\lambda$, and the phase pattern of the focusing term of the phase corrector is $\Omega_f = -k\rho^2/(2f)$.

15. The device according to claim 13, further comprising a focusing element interposed between the beam transformer and the phase corrector, the focusing element having a focal length $f$, wherein the distance between the focusing element and the beam transformer and the distance between the focusing element and the phase corrector is equal to $f$.

16. The device according to claim 10, wherein a wavelengths range of the electromagnetic beams is selected from at least one of:
optical wavelengths comprised between 100 nanometers and 1 millimeter;
microwave wavelengths comprised between 0.1 centimeters and 100 centimeters; or
radio wavelengths comprised between 1 mm and 100 meters.

17. The device according to claim 10, wherein wavelengths ranges of the electromagnetic beams are comprised between 100 nanometers and 1 millimeter, wherein:
the beam transformer is a first diffractive optical element or a metasurface;
the phase corrector is a second diffractive optical element or a metasurface;
the plurality of tilted electromagnetic beams are a plurality of tilted optical beams;
the plurality of transformed electromagnetic beams are a plurality of transformed optical beams;
the plurality of phase-corrected multipole phase electromagnetic beams are a plurality of phase-corrected multipole phase optical beams; and
the multiplexed output electromagnetic beam is a multiplexed output optical beam.

18. The device according to claim 17, further comprising a focusing lens configured to:
receive a plurality of collimated input optical beams generated from a corresponding plurality of laser sources having respective different positions on a plane perpendicular to a propagation direction of the plurality of collimated input optical beams;
focus, on the beam transformer, the plurality of collimated input optical beams into the corresponding plurality of the tilted optical beams.

19. A spatial division telecommunications system comprising:
a multipole phase division demultiplexing device comprising a beam transformer and a phase corrector,
wherein the beam transformer is configured to:
receive an input electromagnetic beam carrying a plurality of electromagnetic beams endowed with multipole phase with equal order and different phase strengths and/or different orientation angles; and
perform a circular-sector transformation conformal mapping of the plurality of multipole phase electromagnetic beams and generate therefrom a corresponding plurality of transformed electromagnetic beams;

wherein the phase corrector is configured to:
receive the plurality of transformed electromagnetic beams;
perform a phase correction of the plurality of transformed electromagnetic beams and generate therefrom a plurality of phase-corrected electromagnetic beams with linear phase pattern, the plurality of phase-corrected electromagnetic beams having different radial directions and/or different angular directions in a space depending on the different phase strengths and/or different orientation angles of the plurality of received multipole phase electromagnetic beams;
a multipole phase division multiplexing device comprising a beam transformer and a phase corrector;
wherein the beam transformer is configured to:
receive a plurality of tilted electromagnetic beams with linear phase patterns and having different radial directions and/or different angular directions in the space; and
perform a combination of |m| circular-sector transformations of the plurality of tilted electromagnetic beams and generate therefrom a plurality of transformed electromagnetic beams, wherein m is an integer number;
wherein the phase corrector is configured to:
receive the plurality of transformed electromagnetic beams;
perform a phase correction of the received plurality of transformed electromagnetic beams, generating therefrom a plurality of phase-corrected electromagnetic beams endowed with multipole phase patterns with equal order m and different phase strengths and/or different orientation angles depending on the different radial directions and/or different angular directions in the space of the plurality of input electromagnetic beams; and
generate a multiplexed output electromagnetic beam carrying said plurality of phase-corrected multipole phase electromagnetic beams; and
a communication channel connecting the multiplexing device with the demultiplexing device, wherein the communication channel includes an optical fiber or a transparent medium, in particular air or water.

20. The system according to claims 19, wherein:
the multiplexing and demultiplexing devices are optical;
the communication channel is an optical fiber connecting the multiplexing optical device with the demultiplexing optical device;
the order of the plurality of phase-corrected multipole phases electromagnetic beams at the output of the multiplexing device is equal to the order of the plurality of electromagnetic beams at the input of the demultiplexing device; or
the order of the plurality of phase-corrected multipole phases electromagnetic beams at the output of the multiplexing device is equal to m and the order of the plurality of electromagnetic beams at the input of the demultiplexing device.

* * * * *